(12) United States Patent
Courtney et al.

(10) Patent No.: US 8,701,166 B2
(45) Date of Patent: Apr. 15, 2014

(54) SECURE AUTHENTICATION

(75) Inventors: Sean Alexander Courtney, Hamilton (CA); Herbert Anthony Little, Waterloo (CA); Alexander Truskovsky, Waterloo (CA)

(73) Assignee: BlackBerry Limited (CA)

( * ) Notice: Subject to any disclaimer, the term of this patent is extended or adjusted under 35 U.S.C. 154(b) by 0 days.

(21) Appl. No.: 13/315,758

(22) Filed: Dec. 9, 2011

(65) Prior Publication Data

US 2013/0152176 A1 Jun. 13, 2013

(51) Int. Cl.
*G06F 7/04* (2006.01)
*G06F 21/36* (2013.01)
*H04W 12/06* (2009.01)
*H04L 29/06* (2006.01)

(52) U.S. Cl.
CPC ............ *G06F 21/36* (2013.01); *H04L 63/0853* (2013.01); *H04W 12/06* (2013.01); *G06F 2221/0733* (2013.01)
USPC .......................................................... 726/5

(58) Field of Classification Search
CPC . G06F 21/36; G06F 21/32; G06F 2221/0733; H04W 12/06; H04L 63/0853
USPC .............. 726/5, 9, 2; 713/182–183, 185, 168 713/172; 380/270
See application file for complete search history.

(56) References Cited

U.S. PATENT DOCUMENTS

| | | | |
|---|---|---|---|
| 7,024,394 B1 * | 4/2006 | Ashour et al. ................... 705/64 |
| 7,634,295 B2 | 12/2009 | Hayaashi et al. | |
| 8,261,089 B2 * | 9/2012 | Leon Cobos et al. ......... 713/185 |
| 2004/0151347 A1 | 8/2004 | Wisniewski | |
| 2008/0104394 A1 * | 5/2008 | Want et al. ..................... 713/168 |
| 2009/0167490 A1 | 7/2009 | Hayaashi et al. | |
| 2009/0265776 A1 * | 10/2009 | Baentsch et al. .................. 726/9 |
| 2010/0057586 A1 | 3/2010 | Chow | |
| 2010/0070759 A1 | 3/2010 | Leon Cobos | |
| 2013/0111208 A1 * | 5/2013 | Sabin et al. .................... 713/171 |
| 2013/0179349 A1 * | 7/2013 | Tsudik et al. .................... 705/44 |
| 2013/0179686 A1 * | 7/2013 | Tsudik et al. .................. 713/168 |

FOREIGN PATENT DOCUMENTS

| | | |
|---|---|---|
| EP | 187832 A1 | 7/1986 |
| EP | 1361723 A2 | 11/2003 |
| EP | 2166697 A1 | 3/2010 |
| WO | WO-2009101549 A2 | 8/2009 |
| WO | WO-2009127984 A1 | 10/2009 |
| WO | WO-2010066141 A1 | 6/2010 |

OTHER PUBLICATIONS

"European Application Serial No. 11192908.9, Extended Search Report mailed Apr. 5, 2012", 10 pgs.

Yang, M., et al., "New authentication scheme for M-commerce based on two dimension bar code", IEEE International Conference on Service Operations and Logistics, and Informatics, 2008. IEEE/SOLI 2008, vol. 1, (2008), 1029-1034.

(Continued)

*Primary Examiner* — Samson Lemma
(74) *Attorney, Agent, or Firm* — Schwegman Lundberg & Woessner, P.A.

(57) ABSTRACT

Apparatus, systems, and methods provide a mechanism to enhance the security of operating client devices with systems controlling secure data. Various embodiments include apparatus and methods to authenticate a communication session between a server and a client device without providing authentication tokens to the client device. Additional apparatus, systems, and methods are disclosed.

30 Claims, 11 Drawing Sheets

(56) References Cited

OTHER PUBLICATIONS

"European Application Serial No. 10172949.9, Extended European Search Report mailed Dec. 6, 2010", 5 pgs.

"European Application Serial No. 10172949.9, Office Action mailed Feb. 17, 2012", 4 pgs.

"European Application Serial No. 10172949.9, Office Action mailed Aug. 28, 2012", 4 pgs.

"European Application Serial No. 11192908.9, Official Communication 94(3)", (Feb. 17, 2014), 7 pgs.

* cited by examiner

SECURE AUTHENTICATION

BACKGROUND

Individuals access and control data in electronic systems on a regular basis. Such data includes data that is of such a personal nature that individuals typically do not want this personal data easily accessible by unauthorized individuals or systems. Such data can also include access to personal assets, to which a user typically desires access limited to the user or to authorized personnel or institutions on a user-controlled basis. Networks and interconnectivity of systems have provided a user with relatively easy access to his personal data and assets.

DETAILED DESCRIPTION

Figure 1:
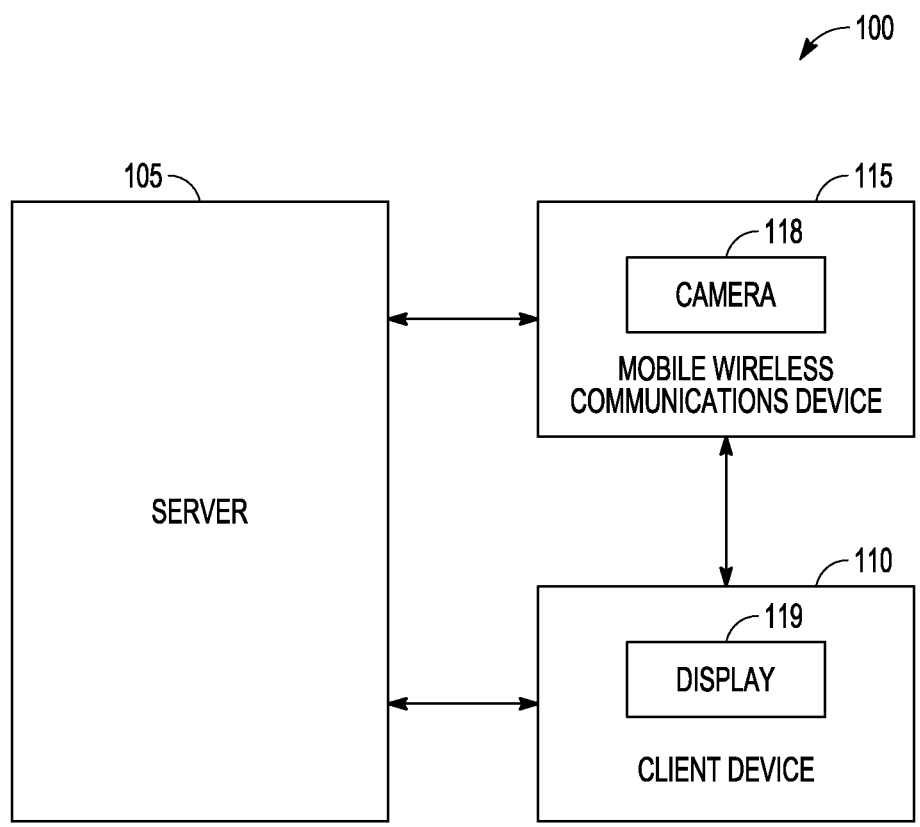
FIG. 1 shows features of an example arrangement to conduct an interactive session from a client device to a server using a mobile wireless communications device without providing an authentication token to the client device, in accordance with various embodiments.

The following detailed description refers to the accompanying drawings that show, by way of illustration, details and embodiments in which the invention may be practiced. These embodiments are described in sufficient detail to enable those skilled in the art to practice embodiments. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

The same networks and interconnectivity of systems that have provided relatively easy access to personal data and assets can be manipulated to provide a path for unauthorized individuals or systems to access and obtain personal data and assets. For example, when signing into secure resources over the internet, a client system used to sign into the secure resource cannot always be trusted to safeguard personal access codes, such as passwords or pins, as a result of malware, viruses, etc, which may be embedded in the client system or have access to the client system. There may also be situations where a user has to employ a system, in which the user has no trust, such as systems found in an internet café. Improvements to network-based systems and operation of these network-based systems can increase the protection of personal data and assets to enhance data and asset security.

In various embodiments, a security mechanism provides protection of a user's personal data or access to assets of the user that the user might provide in a session with an application on a remote resource, where the session includes interaction with the server from a client device. This data or access may include, but is not limited to credit card data, log-in access codes, other personal data, and access to applications that control user assets. The security mechanism allows users to securely authenticate sign-in, sign-out, and confirm transactions in sessions between a server and a client device using their mobile wireless communication device, such as a smartphone, while only ever divulging their username, or equivalent, to the client device. A username or equivalent is typically referred to as a log-in. Equivalents to a username can include an account name, account number, or other format for offering an identification. For security of personal access, systems typically prompt for an access code such as a password or personal identification number (PIN) to accompany presentation of a log-in. Transactions that are confirmed in this manner typically are sensitive transactions that affect data and/or assets of a user, where such data and assets are to be protected from unauthorized access. These resources with which a user may participate in an interactive session from a client device, such as a client computer, to a server can include, but are not limited to, online banking, a virtual private network (VPN), email services, online health records, online shopping, and other resources using an authentication correlated to the user.

Client devices and servers that control data or operate on data may include various apparatus, such as computer systems or other processing systems, having hardware and/or hardware and stored executable instructions to control and/or operate on data. A personal computer (PC) can be used as a component in an interactive session between a server and a client device. A personal computer, as is generally known, herein refers to computing devices having an operating system (OS) such that use of the personal computer may be conducted by individuals having little or no knowledge of the basics of the underlying hardware and instructions that operate the PC and whose operation may be conducted without individuals typically authoring computer programs to operate the computer. Portable computers may include portable personal computers. An example of a portable PC is a laptop computer or notebook computer that typically has a display screen, keyboard, underlying hardware and software, and a display pointing device that are all integrated in a housing that can easily be carried by an individual. Another example of a portable PC is a tablet computer. Some personal digital assistants (PDAs) may be viewed as a type of portable computer.

In various embodiments, a mobile wireless communications device can be implemented to control and/or execute applications that control and/or operate on data. The mobile wireless communications devices may include, but are not limited to, mobile telephones, portable computers, PDAs, and other devices that may be conveniently carried by a user and provide wireless communication. Mobile telephones include wireless communications devices that have generally been referred to as cell phones. Mobile telephones may include a wide range of communication devices from portable phones with limited functionality beyond voice communication to portable phones capable of providing functionality of a personal computer, which portable phones may be referred to as smartphones.

Various instrumentalities can be realized in hardware implementations and combinations of hardware and software-based implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of physical structures responsive to electrical or magnetic signals, where various of the physical structures are capable of being stored, transferred, combined, compared, and otherwise manipulated.

The instrumentality may operate to process, compute, calculate, determine, display, and/or conduct other activities correlated to processes of a machine, such as a computer system or similar electronic computing device, that manipulates and transforms data represented as physical (electronic) quantities within the machine's registers and memories into other data similarly represented as physical quantities within the machine memories or registers or other such data storage, transmission, or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

Herein, an application is a set of instructions physically stored in a device, where the instructions are executable by a controller to conduct one or more tasks associated with operating hardware to perform a specific set of functions. The controller may be realized as one or more processors. An application can include instructions that, when executed, cause one or more apparatus to operate in a specific manner as directed by the execution of the instructions. An application can include instructions in a memory device (or system) that operates on data physically stored in the memory device (or system) or in other memory devices (or systems) such that resulting data is physically stored.

FIG. 1 shows features of an example embodiment of an arrangement 100 to conduct an interactive session from a client device 110 to a server 105 using a mobile wireless communications device 115 without providing an authentication token to client device 110. Herein, an authentication token means an entity to prove identity or gain access to a resource, where the entity is evidence of authority, status, rights, or entitlement to privileges such that only those with proper authentication tokens are admitted access. An authentication token can include a password, a PIN, biometric data, an image, a coded image, or other format that can be physically examined by a machine as authentication to prove identity or gain access to a resource associated with a log-in or other offered identification. Biometric data for authentication can include measurable, distinctive characteristics such as, but not limited to, fingerprints, face recognition, DNA, palm print, hand geometry, iris recognition, retina recognition, scent, typing rhythm, gait, and voice. It is noted that a log-in, which provides an identity, is used in attaining access to a system or sensitive data of a system, but a log-in is not an authentication token, since the log-in provides an identification and not a verification or authentication of the identification.

Mobile wireless communications device 115 includes an application to interact with server 105 to authenticate client device 110, where the application is related to server 100. Mobile wireless communications device 115 can also include encryption keys to enter into a secure communication with server 105 and to encode and/or decode data related to user authentication with respect to interactive sessions between server 105 and client device 110. Mobile wireless communications device 115 can communicate with server 105 over a wireless network, such as, but not limited to, a network to which mobile wireless communications device 115 subscribes. Client device 115 can communicate with server 105 over a network, such as, but not limited to, the Internet.

In an authentication procedure, mobile wireless communications device 115 can communicate with client device 110 by capturing an image on a display 119 of client device 110 using a camera 118 of mobile wireless communications device 115. The image on display 119 can be the result of an encoding procedure on server 105 transmitted to client device 110. After capturing the image, mobile wireless communications device 115, in view of the application associated with server 105, decodes the image, responds to the decoded image, and communicates with server 105. In response to the communication from mobile wireless communications device 115, if deemed valid according to the authentication application in server 105, server 105 enters into an interactive session with client device 110. The authentication process can be conducted without providing authentication tokens to client device 110. This arrangement can be structured in a manner operable with apparatus and processes discussed herein, such as apparatus and processes similar to or identical to apparatus and processes associated with FIGS. 2-7.

Figure 2:
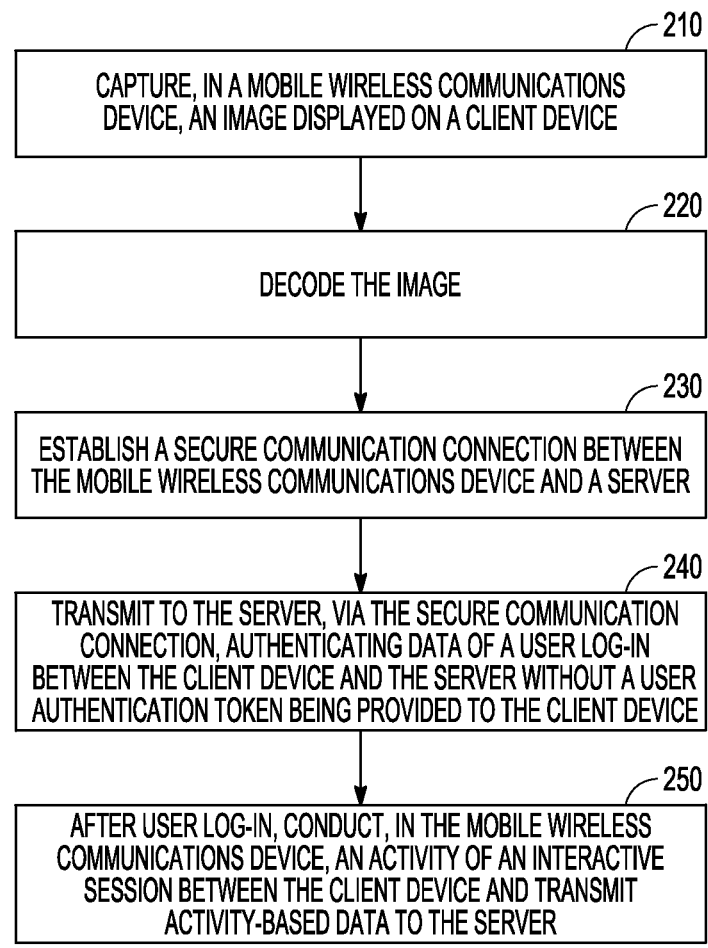
FIG. 2 shows features of an example method of conducting operations in a mobile wireless communications device to provide authentication of a user of a client device to a server without the client device being provided with an authentication token, in accordance with various embodiments.

FIG. 2 shows features of an example embodiment of a method of conducting operations in a mobile wireless communications device to provide authentication of a user of a client device to a server without the client device being provided with an authentication token. This method can be conducted in a manner operable with apparatus and processes discussed herein, such as apparatus and processes similar to or identical to apparatus and processes associated with FIGS. 1 and 3-7. At 210, an image displayed on a client device is captured in the mobile wireless communications device. This capture can be conducted using a camera. The image can be an encoded picture, a set of pictures, a two-dimensional (2D) encoded pattern of varying structures, a 2D barcode, or other image that can be constructed to provide encoded data. At 220, the image is decoded in the mobile wireless communications device.

At 230, a secure communication connection between the mobile wireless communications device and a server is established. The establishment of the secure communication connection can be initiated by the mobile wireless communications device. Alternatively, the establishment of the secure communication connection can be initiated by the server based on a log-in request from the client device to the server, where an authentication token for user log-in is not provided to the client device. Establishing the secure communication connection between the mobile wireless communications device and the server can include using transport layer security (TLS). TLS is an industry-standard security protocol that provides encrypted network communications. TLS encryption uses a digital certificate, which contains identity data and a key, such as a public key, that is used for encrypting communications. The digital certificate can be stored on the server. This can provide a secure communication connection between the mobile wireless communications device and the server. Other security mechanisms can be used including conventional security protocols, propriety security protocols, or combinations of security protocols.

At 240, authenticating data of a user log-in between the client device and the server is transmitted to the server, via the secure communication connection. The authenticating data of the user log-in being provided to the server corresponds to the user log-in to the server being requested from the client device. The authenticating data can be based on the decoded image in the mobile wireless communications device. Transmitting to the server authenticating data can include transmitting data that satisfies a challenge incorporated in the captured image.

At 250, after the user log-in, an activity of an interactive session between the client device and the server is conducted in the mobile wireless communications device and activity based data is transmitted to the server. The activity can include a confirmation of a transaction of an application of the server during the interactive session between the client device and the server. The activity can include a logoff of the interactive session between the client device and the server. The confirmation or the logoff can be conducted via a communication from the mobile wireless communications device to the server to complete the confirmation or the logoff without the authentication token being provided to the client device.

Confirmation of a transaction, while running an application from a server that was launched after user log-in to the server from the client device, can be conducted in a similar manner to authentication of the user log-in from the client device to the server without providing an authentication token to the client device. On processing a transaction of an application, in which confirmation of the transaction is to be provided to the server, a confirmation process can be implemented in the mobile communications device. The mobile wireless communications device can capture an image displayed on the client device during the interactive session. The image can be an encoded picture, a set of pictures, a 2D encoded pattern of varying structures, a 2D barcode, or other image that can be constructed to provide encoded data. This image can be captured using the camera of the mobile wireless communications device. This image is different from the one used to conduct authentication of the user log-in from the client device to the server. This second image includes encoded data that identifies the transaction to be confirmed. It can also include a challenge for the recipient of the encoded data to answer via the mobile wireless communications device. The encoded data may also include data with respect to the authentication of the log-in of the interactive session from which the encoded data was generated by the server.

The second image can be decoded in the mobile wireless communications device. Data extracted from the decoding of the second image can be used to generate a secure confirmation of the transaction. A communication to the server from the mobile wireless communications device can be generated in response to decoding the second image. Authenticating data of the transaction of the interactive session, based on the decoded second image, can be transmitted to the server in the communication. Transmitting authenticating data of the transaction can include transmitting, to the server, an identification of the transaction, where the identification is extracted from decoding the second image. The data sent to the server can include details of the transaction.

Logoff of the user based session of the client device from the server can be conducted via the mobile wireless communications device by generating a logoff request and transmitting the logoff request to the server. The logoff request can include data to terminate connection of the server and the client device, where the data may include data corresponding to the authentication of the user log-in via the mobile wireless communications device.

Figure 3:
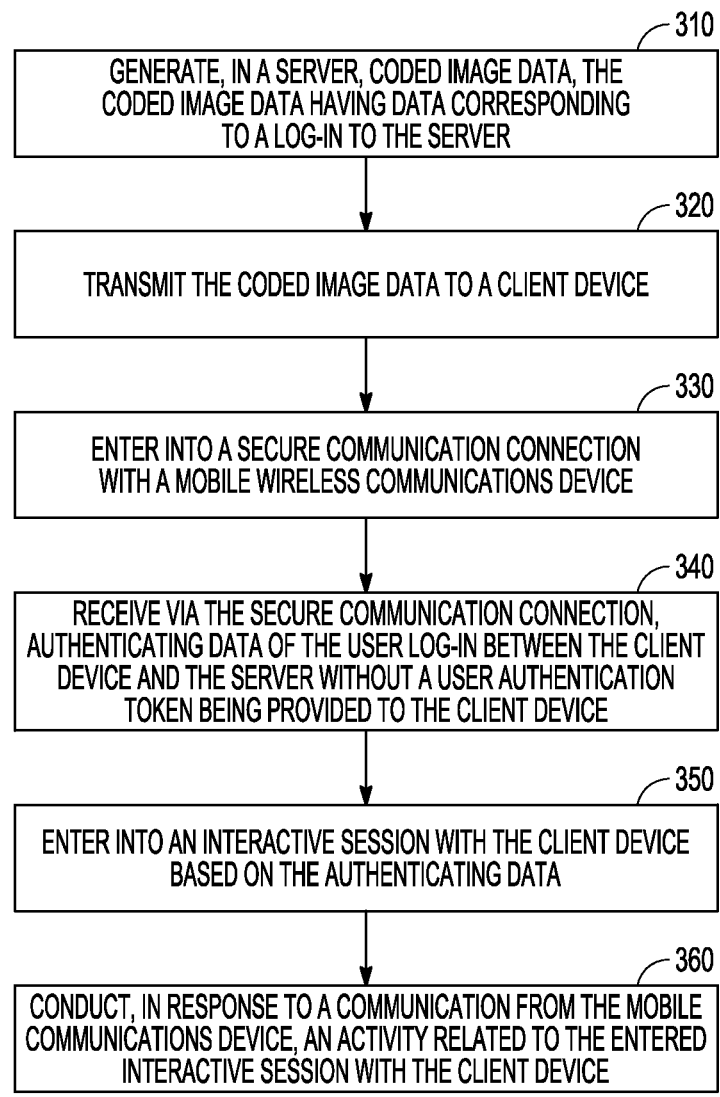
FIG. 3 shows features of an example method of conducting operations in a server to provide authentication of a user of a client device to the server without the client device being provided with an authentication token, in accordance with various embodiments.

FIG. 3 shows features of an example embodiment of a method of conducting operations in a server to provide authentication of a user of a client device to the server without the client device being provided with an authentication token. This method can be conducted in a manner operable with apparatus and processes discussed herein, such as apparatus and processes similar to or identical to apparatus and processes associated with FIGS. 1, 2, 4, 5, 6, and 7. At 310, coded image data is generated in the server. Coded image data is data that can be used to display an image, where the image can include portions of the data. The data in the image can be encoded. The coded image data can include data corresponding to a user log-in to the server. Generating the coded image data can include incorporating a challenge in generating the coded image data.

At 320, the coded image data is transmitted to a client device. The client device corresponds to the requested user log-in related to the coded image data. At 330, the server enters into a secure communication connection with a mobile wireless communications device. The establishment of the secure communication connection can be initiated by the mobile wireless communications device. Alternatively, the establishment of the secure communication connection can be initiated by the server based on the log-in request from the client device, where an authentication token for user log-in is not provided to the client device. Entering into a secure communication connection can include using TLS.

At 340, the server receives, via the secure communication connection, authenticating data of the user log-in between the client device and the server. This authentication process is executed without an authentication token, corresponding to the user log-in to the server, being provided to the client device. The authenticating data can be based on the coded image data transmitted to the client device. At 350, the server enters into an interactive session with the client device based on the authenticating data. Entry into the interactive session, corresponding to the user log-in from the client device to the server, can be based on comparing the authenticating data received by the server with the data of the coded image data generated in the server.

At 360, in response to a communication from the mobile communications device, an activity related to the entered interactive session can be conducted with the client device. Performing the activity can be conducted after entering into the interactive session. The activity can include a confirmation of a transaction of an application of the server during the interactive session between the client device and the server. The activity can include a logoff of the interactive session between the client device and the server. The confirmation or the logoff can be conducted in response to a communication from the mobile wireless communications device to complete the confirmation or the logoff. The confirmation or the logoff can be conducted without the authentication token being provided to the client device.

Confirmation of a transaction, while running an application from a server that was launched after user log-in to the server from the client device, can be conducted in a similar manner as authentication of the user log-in from the client device to the server without providing an authentication token to the client device. On processing a transaction of an application, in which confirmation of the transaction is to be provided to the server, a confirmation process can be implemented beginning with the server generating an identification of the transaction. The server may also generate other data to be conveyed to a user for confirming the transaction. The identification and other data can be encoded into coded image data. This coded image data is different from the coded image data used to conduct authentication of the user log-in from the client device to the server. This second coded image data includes encoded data that identifies the transaction to be confirmed. It may also include a challenge for the recipient of the encoded data to answer. The encoded data may also include data with respect to the authentication of the log-in of the interactive session from which the encoded data was generated by the server.

The server transmits the second coded image data to the client device. Subsequently, the server receives authenticating data of the transaction from the mobile wireless communications device in a secure communication connection without the authentication token being provided to the client device. The authenticating data can be based on the second coded image data transmitted to the client device. The server can complete the confirmation of the transaction based on the authenticating data received from the mobile wireless communications device. Completing the confirmation of the transaction in the server can include comparing the identification of the transaction generated by the server with a transaction identification received in the authenticating data of the transaction.

Logoff of the client device from the server, relative to the authenticated user log-in process, can be conducted in response to a communication from the mobile communications device. Conducting the logoff can include receiving a logoff request from the mobile wireless communications device. The logoff request can include data to terminate connection of the server and client device corresponding to the user log-in. Conducting the logoff can include the server invalidating cookies associated with the user log-in. Conducting the logoff can include the server invalidating session data cached by the client device.

Figure 4:
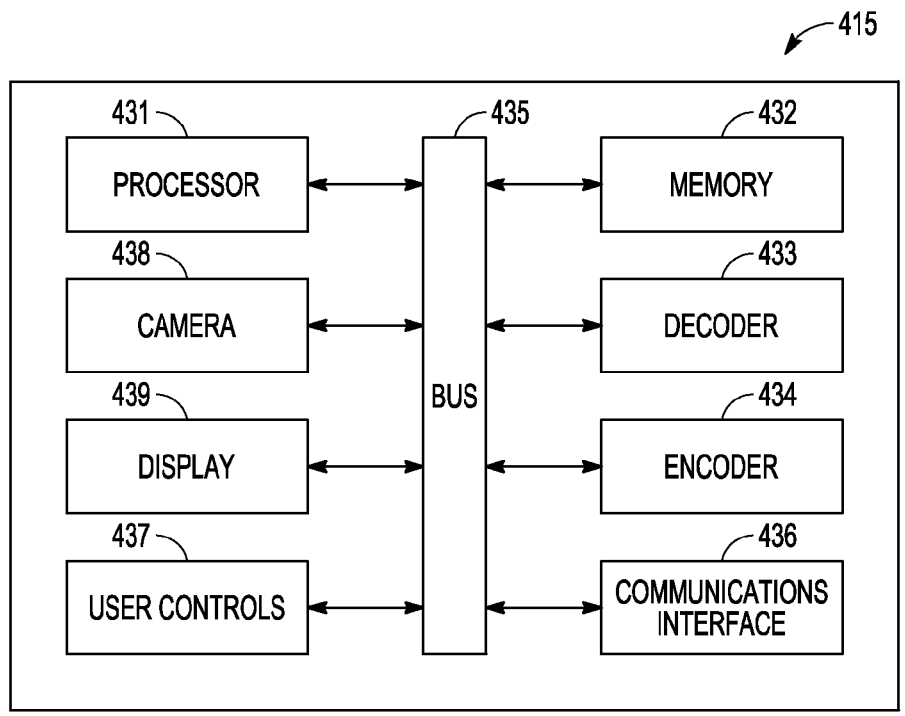
FIG. 4 shows a block diagram of an example mobile wireless communications device operable to provide authentication of a user of a client device to a server without the client device being provided with an authentication token, according to various embodiments.

FIG. 4 shows a block diagram of an example embodiment of a mobile wireless communications device 415 operable to provide authentication of a user of a client device to a server without the client device being provided with an authentication token. Mobile wireless communications device 415 can be structured in a manner operable with apparatus and processes discussed herein, such as apparatus and processes similar to or identical to apparatus and processes associated with FIGS. 1-3, 5, 6, and 7. Mobile wireless communications device 415 can include, among other components, a processor 431, a memory 432, a camera 438, a decoder 433, an encoder 434, and a communications interface 436. Processor 431 can be realized as one or more processors. Memory 432, operably coupled to processor 431, can include data storage devices to store parameters to operate mobile wireless communications device 415. Mobile wireless communications device 415 can include a display 439 and user controls 437.

Various components of mobile wireless communications device 415 can be coupled among each other using a bus 435. Bus 435 provides electrical conductivity for transferal of signals and data among the components of mobile wireless communications device 415. In an embodiment, bus 435 can include an address bus, a data bus, and a control bus, each independently configured. In an alternative embodiment, bus 435 uses common conductive lines for providing one or more of address, data, or control, the use of which can be regulated by processor 431. Bus 435 may be realized as multiple busses.

Communications interface 436 can include one or more communications interfaces to operate over a wired network and/or a wireless network. The communications of mobile wireless communications device 415 with external entities can be conducted on a secured basis. Example interfaces can include a Wi-Fi interface, a USB interface, an Ethernet interface, an infrared interface, a Bluetooth interface, an RFID interface, a NFC interface, an interface to operate with a wireless service provider, and other appropriate communication interfaces.

The components of mobile wireless communications device 415 can be structured as independent units in mobile wireless communications device 415. Various of the components of mobile wireless communications device 415 can be structured as integrated or partially integrated components in mobile wireless communications device 415. For example, with respect to encoder 434 and decoder 433, instructions and/or parameters for encoding and decoding data to be transmitted from and received in mobile wireless communications device 415, respectively, can be incorporated in memory 432. These instructions and/or parameters can be executed by processor 431. Further, encoder 434 and decoder 433 can be integrated and may be incorporated or partially incorporated in communications interface 436.

Processor 431, memory 432, camera 438, decoder 433, encoder 434, and communications interface 436 can be arranged to operably capture an image displayed on a client device; decode the image; establish a secure communication connection between mobile wireless communications device 415 and a server; transmit to the server, via the secure communication connection, authenticating data of a user log-in between the client device and the server without an authentication token being provided to the client device; and conduct an activity of an interactive session between the client device and the server. The image can be an encoded picture, a set of pictures, a 2D encoded pattern of varying structures, a 2D barcode, or other image that can be constructed to provide encoded data. The authenticating data can be based on the decoded image. The conducted activity can include, after the user log-in to the server, a confirmation of a transaction of an application of the server during an interactive session between the client device and the server. The conducted activity can include, after the user log-in, a logoff of the interactive session between the client device and the server. The confirmation or the logoff can be conducted via a communication from mobile wireless communications device 415 to the server effectively instructing the server to complete the confirmation or the logoff without the authentication token being provided to the client device.

The confirmation of a transaction of an application of a server, during the interactive session of the server with a client device, can be operably conducted with processor 431, memory 432, camera 438, decoder 433, encoder 434, and communications interface 436 arranged to capture an image displayed on the client device; decode the image; generate a communication to the server in response to the decoded image; and transmit, to the server in the communication, authenticating data of the transaction based on the decoded image. This transaction-based image is another image, or second image, following the image used to authenticate log-in from the client device to the server, where generation of the transaction-based image occurs in the time interval after log-in and before log-off. The image can be an encoded picture, a set of pictures, a 2D encoded pattern of varying structures, a 2D barcode, or other image that can be constructed to provide encoded data. The transaction-based image may include authentication data from the authentication process that opened the interactive session between the server and the client device. During the interactive session between the server and the client device, mobile wireless communications device 415 can operate in a number of different transaction confirmations. Each transaction confirmation can include mobile wireless communications device 415 operating between the client device and the server such that the transactions are confirmed without authentication tokens being provided to the client device.

Processor 431, memory 432, camera 438, decoder 433, encoder 434, and communications interface 436 of mobile wireless communications device 415 can be arranged to operably conduct the logoff of the client device from the server. Mobile wireless communications device 415 can generate a logoff request and transmit the logoff request to the server. The logoff request can include data to terminate the connection of the server and the client device. This data can include data corresponding to the user log-in. Mobile wireless communications device 415 can be structured with a plurality of log-in related applications and a plurality of transaction related applications such that mobile wireless communications device 415 is operable with a plurality of servers, on an individual basis, with respect to server sessions with a number of different client devices without authentication tokens being provided to these client devices.

Figure 5:
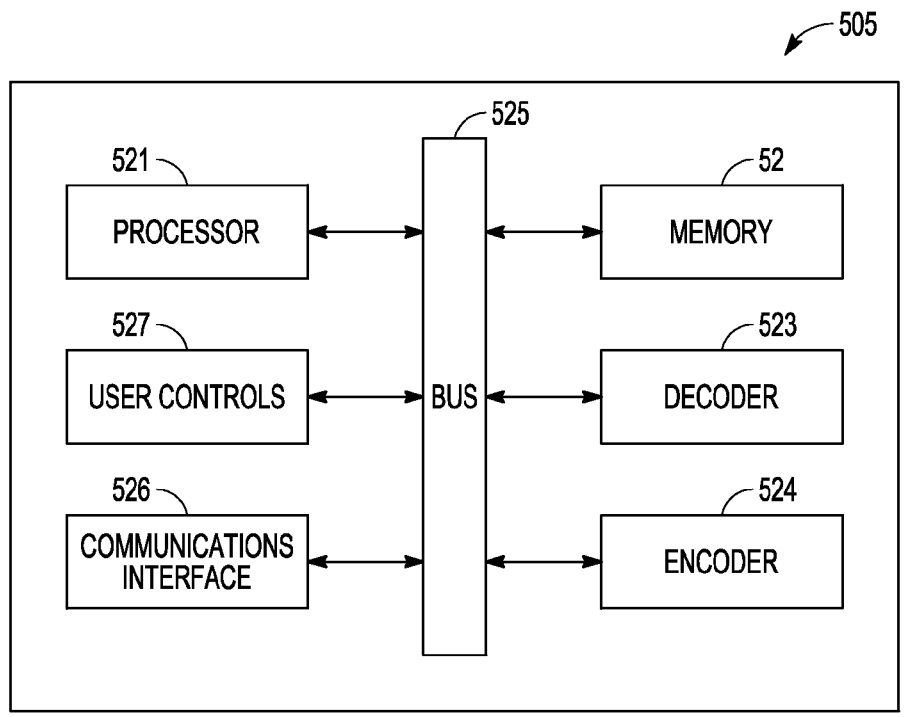
FIG. 5 shows a block diagram of an example server operable to provide authentication of a user of a client device to the server without the client device being provided with an authentication token, according to various embodiments.

FIG. 5 shows a block diagram of an example embodiment of a server 505 operable to provide authentication of a user of a client device to server 505 without the client device being provided with an authentication token. Server 505 can be structured in a manner operable with apparatus and processes discussed herein, such as apparatus and processes similar to or identical to apparatus and processes associated with FIGS. 1-4, 6, and 7. Server 505 can include, among other components, a processor 521, a memory 522, a decoder 523, an encoder 524, and a communications interface 526. Processor 521 can be realized as one or more processors. Memory 522, operably coupled to processor 521, can include data storage devices to store parameters to operate server 505. Server 505 may include user controls 527.

Various components of server 505 can be coupled among each other using a bus 525. Bus 525 provides electrical conductivity for transferal of signals and data among the components of server 505. In an embodiment, bus 525 can include an address bus, a data bus, and a control bus, each independently configured. In an alternative embodiment, bus 525 can use common conductive lines for providing one or more of address, data, or control, the use of which can be regulated by processor 521. Bus 525 may be realized as multiple busses.

Communications interface 526 can include one or more communications interfaces to operate over a wired network and/or a wireless network. The communications of server 505 with external entities can be conducted on a secured basis. Example interfaces can include a Wi-Fi interface, a USB interface, an Ethernet interface, an infrared interface, a Bluetooth interface, an RFID interface, a NFC interface, an interface to operate with a wireless service provider, and other appropriate communication interfaces.

The components of server 505 can be structured as independent units in server 505. Various components of server 505 can be structured as integrated or partially integrated components in server 505. For example, with respect to encoder 524 and decoder 523, instructions and/or parameters for encoding and decoding data to be transmitted from and received in server 505, respectively, can be incorporated in memory 522. The instructions and/or parameters can be executed by processor 521. Further, encoder 524 and decoder 523 can be incorporated or partially incorporated in communications interface 526.

Processor 521, memory 522, encoder 524, decoder 523, and communications interface 526 can be arranged to operably generate coded image data, where the coded image data has data corresponding to a requested user log-in to server 505; transmit the coded image data to a client device associated with the user log-in; enter into a secure communication connection with a mobile wireless communications device; receive, via the secure communication connection, authenticating data of the user log-in between the client device and server 505 without an authentication token being provided to the client device; enter into an interactive session with the client device; and conduct an activity of the interactive session between the client device and server 505. The interactive session corresponds to the coded image data transmitted to the client device for user log-in. The image can be an encoded picture, a set of pictures, a 2D encoded pattern of varying structures, a 2D barcode, or other image that can be constructed to provide encoded data. The authenticating data can be based on comparing the authenticating data with the data of the coded image data. The conducted activity can include, after the user log-in, a confirmation of a transaction of an application of the server during the interactive session between the client device and server 505. The conducted activity can include, after the user log-in, a logoff of the interactive session between the client device and server 505. The confirmation or the logoff can be conducted in response to a communication from the mobile wireless communications device to complete the confirmation or the logoff, where the confirmation or the logoff are being conducted without authentication tokens being provided to the client device.

The confirmation of a transaction of an application of server 505, during the interactive session of server 505 with a client device, can be operably conducted with processor 521, memory 522, encoder 524, decoder 523, and communications interface 526 arranged to generate an identification of the transaction; encode the identification into a coded image data; transmit the coded image data to the client device; receive authenticating data of the transaction from a mobile wireless communications device without the authentication token being provided to the client device, where the authenticating data is based on the coded image data transmitted to the client device; and complete the confirmation of the transaction based on the authenticating data. The image can be an encoded picture, a set of pictures, a 2D encoded pattern of varying structures, a 2D barcode, or other image that can be constructed to provide encoded data. This transaction-based coded image data is another coded image data, or second coded image data, following the generation of the coded image data used to authenticate log-in from the client device to server 505, where generation of the transaction-based coded image data occurs in the time interval after log-in and before log-off. The transaction-based coded image data may include authentication data from the authentication process that opened the interactive session between the server and the client device. During the interactive session between server 505 and the client device, server 505 can operate to generate and complete a number of different transaction confirmations. Each transaction confirmation can include server 505 operating with the mobile wireless communications device between the client device and server 505 such that the transactions are confirmed without authentication tokens being provided to the client device.

Processor 521, memory 522, encoder 524, decoder 523, and communications interface 526 of server 505 can be arranged to operably conduct the logoff of the client device in conjunction with the mobile wireless communications device that participated in the authentication of the log-in from the client device to server 505. Server 505 can be arranged to invalidate cookies associated with the authenticated user log-in to conduct the logoff process. Server 505 can be arranged to invalidate session data cached by the client device. Server 505 can execute a combination of different logoff tasks to protect the security of the data accessible through server 505. Server 505 can be structured with a plurality of log-in applications and a plurality of transactional applications such that server 505 is operable with a plurality of mobile wireless communications devices, on an individual basis, with respect to server sessions with a number of different client devices without authentication tokens being provided to these client devices.

In various embodiments, secure internet sessions between a server and a client computer can be conducted using a smartphone. The smartphone includes an application issued by an institution associated with the server, where the server holds user data. The user data can include a user certificate that is linked to a unique user identification (ID) and a root certificate that is trusted. The application in the smartphone provides a mechanism in which the server can enter a secure session with the client computer without using a password or sensitive data in the client computer. The application on the smartphone can ensure that a user can access secure resources on the server from an untrusted system such as the client computer. The client computer may be untrusted by the institution or may be untrusted by the user; for example, the client computer may be a public computer in an internet café. The institution may be, but is not limited to, an online banking system, an e-mail service, an online health records system, online shopping site, or other network-based resource that operates on user sensitive data or assets.

Figure 6A:
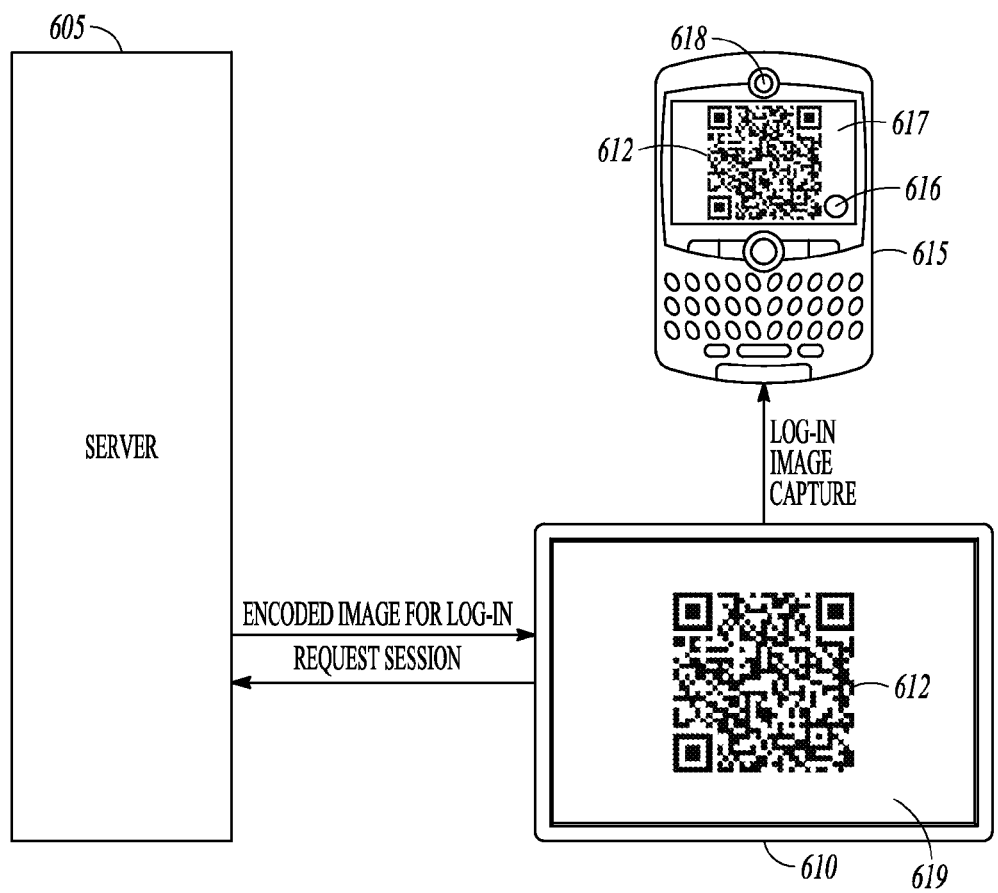
FIGS. 6A-F illustrate a method of operating an application from a server using a client device without providing an authentication token to the client device, according to various embodiments.

FIGS. 6A-F illustrate a method of operating an application from a server 605 using a client device 610 without providing an authentication token to client device 610. The method may be conducted in accordance methods and apparatus as taught herein. Server 605 can be structured with appropriate hardware and physically stored instructions to perform the activities discussed herein to operate one or more applications from server 605 using client device 610 without providing an authentication token to client device 610. Such hardware may include, but is not limited to, processors, memory devices, wireless communication related hardware, and hardware to operate over a wide area network such as the Internet. As shown in FIG. 6A, a request to enter into a session is received in server 605 from client device 610. The request can contain an identification of the requester for log-in without an authentication token. Server 605 can generate an encoded image having a challenge based on the identification. The challenge can be signed by server 605. Server 605 can transmit the encoded image to client device 610. The encoded image is shown on a display 619 of client device 610.

A mobile wireless communications device 615 running an application correlated to server 605 can capture the displayed image 612 using camera 618 of mobile wireless communications device 615 and may show image 612 on its display 617. Mobile wireless communications device 615 can be structured with appropriate hardware and physically stored instructions to perform the activities discussed herein to allow server 605 to operate one or more applications from server 605 using client device 610 without providing an authentication token to client device 610. Such hardware may include, but is not limited to , processors, memory devices, wireless communication related hardware, and, optionally, wired based hardware to couple to devices operate over a wide area network such as the Internet. Displayed image 612 can be can be an encoded picture, a set of pictures, a 2D encoded pattern of varying structures, a 2D barcode, or other image that can be constructed to provide encoded data. The capture can be conducted by actuating a capture image button 616 provided by the application running on mobile wireless communications device 615. Optionally, image button 616 can be displayed on display 617 until the session between server 605 and client device 610 is completed or only be displayed at the various image capture times. Image 612 captured in mobile wireless communications device 615 can be decoded using the application in mobile wireless communications device 615.

Figure 6B:
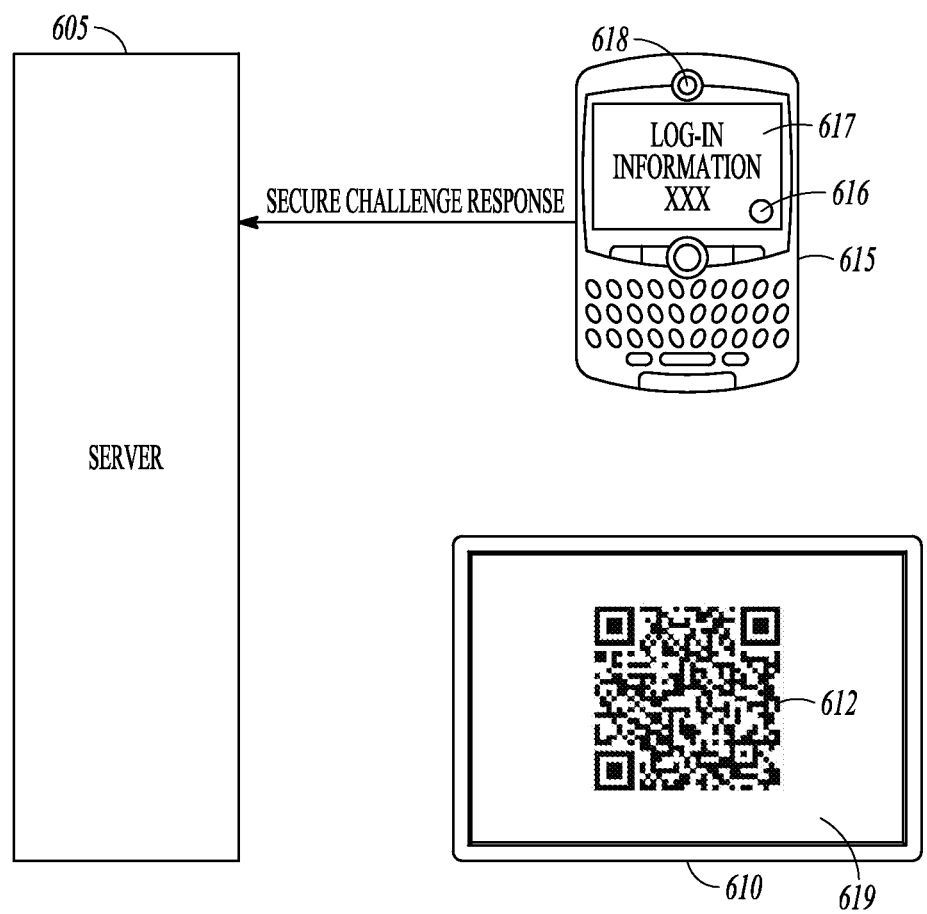
Figure 6C:
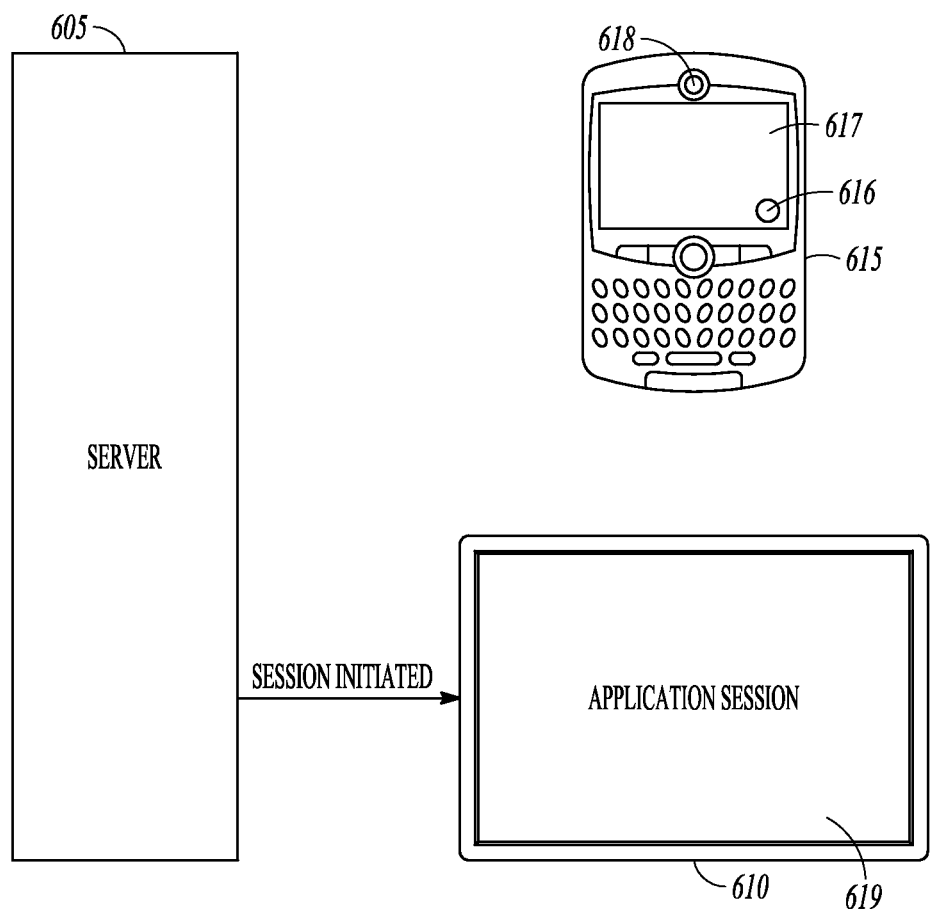

As shown in FIG. 6B, once mobile wireless communications device 615 captures image 612, mobile wireless communications device 615 can generate on its display some details of the log-in request before the requester takes action to proceed in confirming the log-in. Once the requester proceeds to confirm the log-in using wireless communications device 615, a response to the challenge can be generated and a secure communication established between mobile wireless communications device 615 and server 605. Mobile wireless communications device 615 can send appropriate data in response to the challenge to server 605 such that server 605 establishes a session with client device 610 for the requester as shown in FIG. 6C.

Figure 6D:
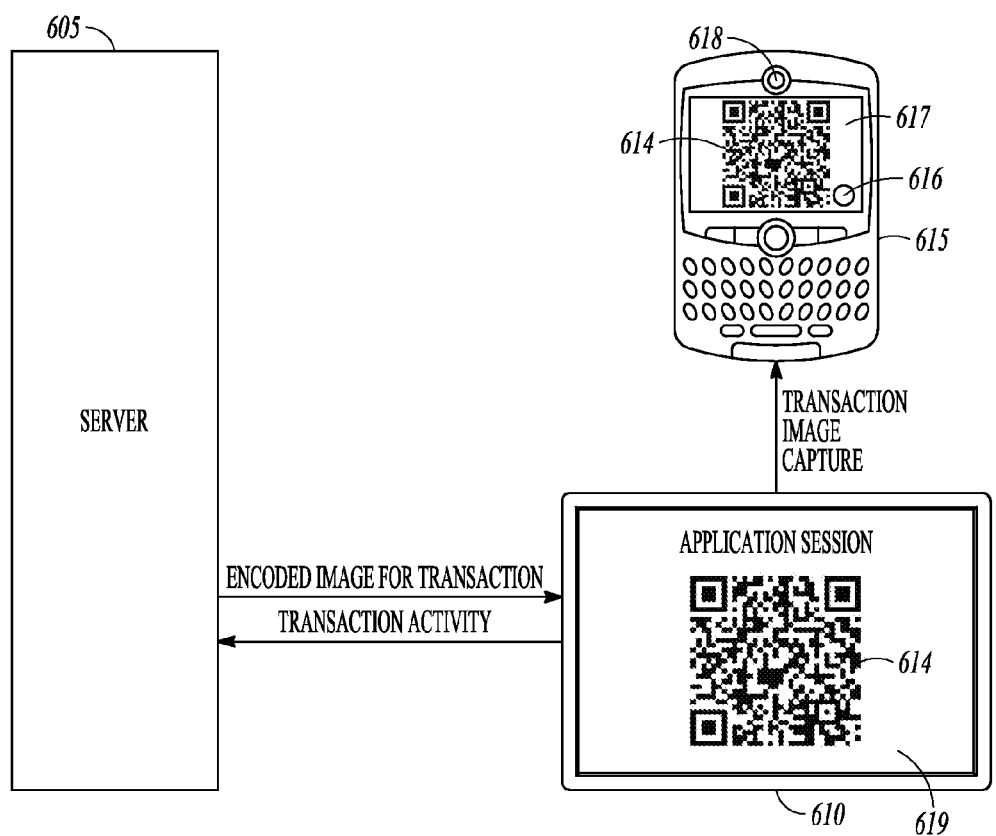

As shown in FIG. 6D, after establishing the session, the requester can operate a data sensitive application with server 605 from client device 610. In conducting the data sensitive application, the requester can perform a confirmation of a transaction with server 605 in response to the transaction activity being received at server 605 from client device 610. Server 605 can generate a new encoded image having confirmation data. The new encoded image may include another challenge signed by server 605. Server 605 can transmit the new encoded image 614 to client device 610, which can be shown on display 619. Mobile wireless communications device 615 can capture the displayed new image 614 using camera 618 and decode the captured image 614. Displayed image 614 can be can be an encoded picture, a set of pictures, a 2D encoded pattern of varying structures, a 2D barcode, or other image that can be constructed to provide encoded data.

Figure 6E:
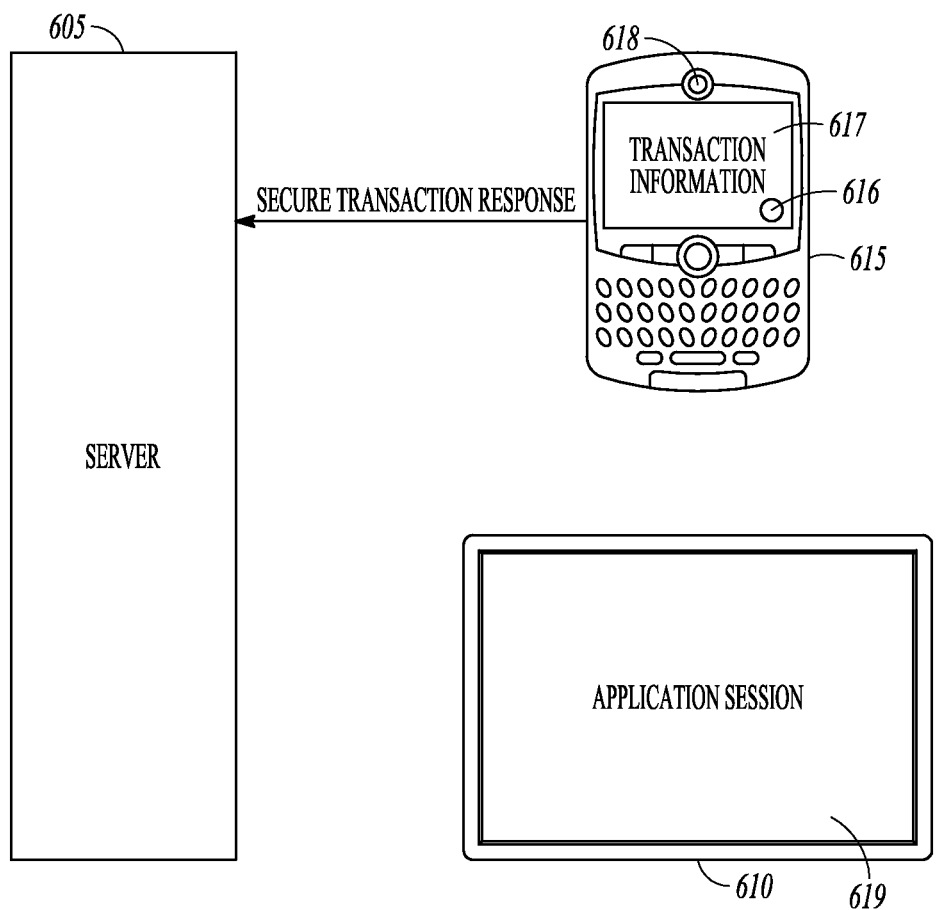

As shown in FIG. 6E, once mobile wireless communications device 615 captures image 614, mobile wireless communications device 615 can generate on its display 617 some details of the transaction confirmation before the requester takes action to proceed in confirming the transaction. Once the requester proceeds to confirm the transaction on wireless communications device 615, wireless communications device 615 can generate a response to the challenge, establish a secure communication between mobile wireless communications device 615 and server 605, and transmit the transaction confirmation response to server 605.

Figure 6F:
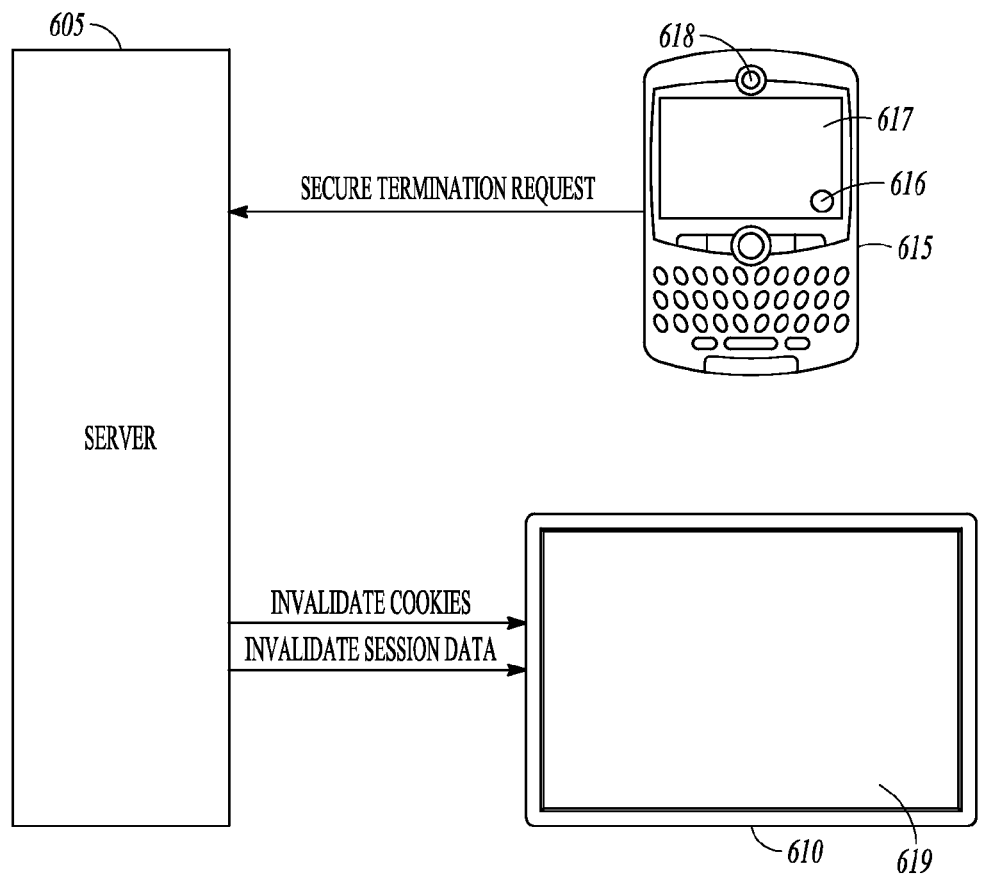

As shown in FIG. 6F, when the requester decides to terminate the session with server 605, a termination request can be generated from mobile wireless communications device 615 to server 605. In response to the termination request, server 605 can send a communication to client device 610 to invalidate cookies associated with the authenticated log-in. Server 605 also can send a communication to client device 610 to invalidate session data cached by client device 610.

Figure 7:
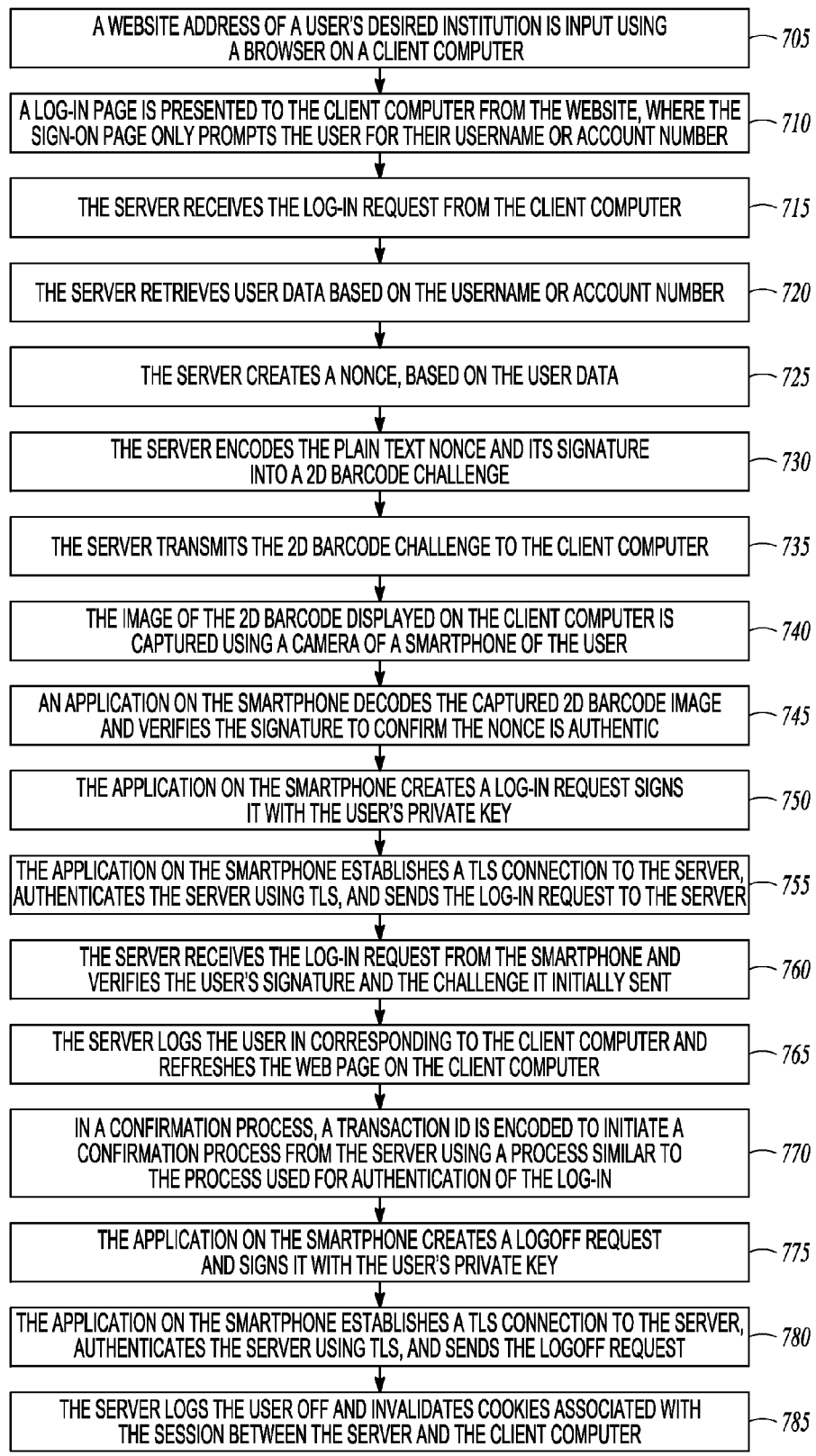
FIG. 7 shows a non-limiting example of a secure internet session between a server and a client computer enabled by a mobile wireless communications device, according to various embodiments.

FIG. 7 shows a non-limiting example of a secure internet session between a server and a client computer enabled by a mobile wireless communications device such as a smartphone. This example can be realized in a manner operable with apparatus and processes discussed herein, such as apparatus and processes similar to or identical to apparatus and processes associated with FIGS. 1-6. At 705, a website address of a user's desired institution, such as a banking site for example, is input using a browser on a client computer to which the user is initiating a secure session. The page at the website address includes a sign-on page of that institution or links to the sign-on page of that institution. At 710, the website presents the sign-on page, also referred to as a log-in page or logon page, where the sign-on page only prompts the user for their username or account number, which identifies the user to the institution. At 715, the server receives the log-in request from the client computer. At 720, the server retrieves user data based on the username or account number. Other non-authentication data can be used to identify the user to the server associated with the institution.

At 725, based on the user data, the server creates a nonce. The server signs the nonce by generating a digital signature of the nonce using an authentication key. At 730, the server encodes the plain text nonce and its signature into a two-dimensional (2D) barcode challenge. At 735, the server transmits this 2D barcode challenge to the client computer, where the browser of the client computer displays the 2D image.

At 740, with the 2D barcode displayed on the client computer, this image can be captured using a camera of the smartphone of the user. This capture process can be realized by using the authenticating application from the institution of the server. In an embodiment, with the application running on the smartphone, a view from the camera and a log-in button can be presented on the display of the smartphone. The user points the camera at the 2D barcode generated by the server and displayed on the client computer and takes a picture of the barcode on the display of the client computer using the log-in button. Alternatively, the application can be arranged such that, with the application running, the standard mode of taking a picture with the camera can be used to capture the 2D barcode and the captured image can be selected from image files in the smartphone in the authentication procedure of the application.

At 745, with the 2D barcode captured on the user's smartphone, the application on the smartphone decodes the image and verifies the signature to confirm the nonce is authentic. At 750, the application on the smartphone creates a log-in request, which can include the received nonce and signs it with the user's private key. This private key can be issued to the smartphone, corresponding to the user, by the institution that provides the application to the smartphone. At 755, the application on the smartphone can establish a TLS connection to the server, authenticate the server using TLS, and send the log-in request to the server.

At 760, the server receives the log-in request from the smartphone and verifies the user's signature and the challenge it initially sent. At 765, the server logs the user in corresponding to the client computer, refreshes the web page on the client computer, and provides access to the account in the institution corresponding to the username or account number from which the authentication process was initiated. During the time that the user is logged into the institution web page, such as a bank web page, the application running in the server and the associated application in the user's smartphone can also be used to confirm account transactions using a process similar to or identical to the process used for authentication of the log-in. At 770, in the confirmation process, a corresponding transaction ID can be encoded into the 2D barcode being generated to initiate the confirmation process from the server. In an example where the institution is an e-mail service, for an e-mail, a process similar to or identical to the abovementioned process can be used to sign e-mails to verify their authenticity.

When the secure session between the server and the client computer is complete, logging off from the session between the computer client and the server can be executed from the smartphone. This log off procedure can be realized as part of the features of the smartphone application that provided the instructions to authenticate the log-in from the client computer to the server. At, 775, the application creates a logoff request and signs it with the user's private key. At 780, the application on the smartphone establishes a TLS connection to the server, authenticates the server using TLS, and sends the logoff request. At 785, the server logs the user off and invalidates cookies associated with the session between the server and the client computer. The server can also invalidate session data cached by the client computer employed by the user.

To ensure security of the user data and user assets accessible via the server, inadvertent failure of the user to execute logoff, using the smartphone in accordance with the above method, can be addressed by default parameters in the server. The server can automatically log the user out after a fixed time. The fixed time set in the server can be a user set parameter. The fixed time can be set by the user to a lower time than a default time for being logged-in to the server. The user can specify the lower time in a user interface on the user's smartphone. The lower time limit for the session can be transmitted to the server when the initial session is authenticated using the smartphone. This time limit can be a total length of time of the secure session. This time limit can be set as a time since a last activity was conducted in the interactive session between the client computer and the server.

Use of an authentication process as discussed herein provides for secure operation in which no secret authentication tokens are provided to an untrusted system. In addition, a user does not rely on the untrusted system to perform logout and wipe any session data, such as cookies. In the case of a banking application using the transaction confirmation process, for example, the untrusted system cannot perform transactions without user knowledge. The system and procedures can also be used for signing emails without authentication tokens attached to a local system, that is, signing is performed like a transaction for banking. The signing of the e-mail can be authorized on the smartphone and not on the client computer.

In various embodiments, a machine-readable storage device, such as a computer-readable storage device, has machine-executable instructions, which when executed by a controller, such as a processor, cause a mobile wireless communications device to operate in conjunction with a server to provide authentication of a user of a client device to a server without the client device being provided with an authentication token. These instructions provide a mechanism for a mobile wireless communications device to operate in a manner similar to or identical to a mobile wireless communications device associated with FIGS. 1-7. The machine-readable storage device is not limited to any one type of device. Further, a machine-readable storage device, herein, is a physical device that stores data represented by physical structure within the device. Machine-readable storage devices may include, but are not limited to, solid-state memories, optical devices, and magnetic devices. Examples of machine-readable storage devices include, but are not limited to, read only memory (ROM), random access memory (RAM), a magnetic disk storage device, an optical storage device, a flash memory, and other electronic, magnetic, and/or optical memory-like devices.

In various embodiments, a machine-readable storage device, such as a computer-readable storage device, has machine-executable instructions, which when executed by a controller, such as a processor, cause a server to operate in conjunction with a mobile wireless communications device to provide authentication of a user of a client device to the server without the client device being provided with an authentication token. These instructions provide a mechanism for the server to operate in a manner similar to or identical to a server associated with FIGS. 1-7. The machine-readable storage device is not limited to any one type of device. Machine-readable storage devices may include, but are not limited to, solid-state memories, optical devices, and magnetic devices. Examples of machine-readable storage devices include, but are not limited to, read only memory (ROM), random access memory (RAM), a magnetic disk storage device, an optical storage device, a flash memory, and other electronic, magnetic, and/or optical memory-like devices.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    conducting operations in a mobile wireless communications device using a controller of the mobile wireless communications device, the operations including:
        capturing an image displayed on a client device;
        decoding the image;
        establishing a secure communication connection between the mobile wireless communications device and a server;
        transmitting to the server, via the secure communication connection, authenticating data of a user log-in between the client device and the server without an authentication token, corresponding to the user log-in, being provided to the client device, the authenticating data being based on the decoded image;
        conducting, after the user log-in, a confirmation of a transaction of an application of the server during an interactive session between the client device and the server, the confirmation being conducted via a communication from the mobile wireless communications device to the server to complete the confirmation without an authentication token being provided to the client device; and
        generating, after the user log-in and the confirmation, a logoff request in the mobile wireless communications device to conduct a logoff between the client device and the server, and transmitting the logoff request to the server, the logoff request including data to terminate connection of the server and the client device, the data corresponding to the user log-in between the client device and the server, wherein the logoff is conducted without an authentication token being provided to the client device.

2. The method of claim 1, wherein conducting the confirmation in the mobile wireless communications device includes:
    capturing a second image displayed on the client device during the interactive session;
    decoding the second image;
    generating a communication to the server in response to decoding the second image; and
    transmitting, to the server in the communication, second authenticating data of the transaction of the interactive session based on the decoded second image.

3. The method of claim 2, wherein transmitting the second authenticating data of the transaction includes transmitting, to the server, an identification of the transaction, the identification being extracted from decoding the second image.

4. The method of claim 1, wherein decoding the image includes decoding the image such that a plain text nonce and digital signature, generated by the server, is produced.

5. The method of claim 1, wherein establishing the secure communication connection between the mobile wireless communications device and the server includes using transport layer security (TLS).

6. The method of claim 1, wherein transmitting to the server authenticating data includes transmitting data that satisfies a challenge incorporated in the captured image.

7. A method comprising:
    conducting operations in a server using a controller of the server, the operations including:
        generating coded image data, the coded image data having data corresponding to a user log-in to the server;
        transmitting the coded image data to a client device;
        entering into a secure communication connection with a mobile wireless communications device;
        receiving via the secure communication connection, authenticating data of the user log-in between the client device and the server without an authentication token, corresponding to the user log-in, being provided to the client device, the authenticating data based on the coded image data transmitted to the client device;
        entering into an interactive session with the client device, without an authentication token being provided to the client device, based on comparing the authenticating data with the data of the coded image data, the interactive session corresponding to the user log-in;
        conducting a confirmation of a transaction of an application of the server during the interactive session between the client device and the server, the confirmation conducted in response to a communication from the mobile wireless communications device to complete the confirmation, the confirmation being conducted without an authentication token being provided to the client device; and
        conducting a logoff of the client device from the server, the logoff including receiving a logoff request from the mobile wireless communications device, the logoff request including data to terminate connection of the server and client device corresponding to the user log-in between the client device and the server, wherein the logoff is conducted without an authentication token being provided to the client device.

8. The method of claim 7, wherein conducting the confirmation in the server includes:
    generating an identification of the transaction;
    encoding the identification into a second coded image data;

transmitting the second coded image data to the client device;

receiving second authenticating data of the transaction from the mobile wireless communications device without an authentication token being provided to the client device, the second authenticating data based on the second coded image data transmitted to the client device; and completing the confirmation of the transaction based on the second authenticating data.

9. The method of claim 8, wherein completing the confirmation of the transaction in the server includes comparing the identification of the transaction generated by the server with a transaction identification received in the second authenticating data of the transaction.

10. The method of claim 7, generating coded image data includes encoding a plain text nonce and digital signature.

11. The method of claim 10, wherein conducting the logoff includes the server invalidating cookies associated with the user log-in.

12. The method of claim 10, wherein conducting the logoff includes the server invalidating session data cached by the client device.

13. The method of claim 7, wherein entering into a secure communication connection includes using transport layer security (TLS).

14. The method of claim 7, wherein generating the coded image data includes incorporating a challenge in generating the coded image data.

15. A machine-readable storage device having instructions stored thereon, which instructions, when executed by a processor, cause a mobile wireless communications device to perform operations, the operations comprising:

capturing an image displayed on a client device;

decoding the image;

establishing a secure communication connection between the mobile wireless communications device and a server;

transmitting to the server, via the secure communication connection, authenticating data of a user log-in between the client device and the server without an authentication token, corresponding to the user log-in, being provided to the client device, the authenticating data being based on the decoded image;

conducting, after the user log-in, a confirmation of a transaction of an application of the server during an interactive session between the client device and the server, the confirmation being conducted via a communication from the mobile wireless communications device to the server to complete the confirmation without an authentication token being provided to the client device; and generating, after the user log-in and the confirmation, a logoff request in the mobile wireless communications device to conduct a logoff between the client device and the server, and transmitting the logoff request to the server, the logoff request including data to terminate connection of the server and the client device, the data corresponding to the user log-in between the client device and the server, wherein the logoff is conducted without an authentication token being provided to the client device.

16. The machine-readable storage device of claim 15, wherein conducting the confirmation in the mobile wireless communications device includes:

capturing a second image displayed on the client device during the interactive session;

decoding the second image;

generating a communication to the server in response to decoding the second image; and transmitting, to the server in the communication, second authenticating data of the transaction of the interactive session based on the decoded second image.

17. The machine-readable storage device of claim 16, wherein transmitting the second authenticating data of the transaction includes transmitting, to the server, an identification of the transaction, the identification being extracted from decoding the second image.

18. The machine-readable storage device of claim 15, wherein decoding the image includes decoding the image such that a plain text nonce and digital signature, generated by the server, is produced.

19. A machine-readable storage device having instructions stored thereon, which instructions, when executed by a processor, cause a server to perform operations, the operations comprising:

generating coded image data, the coded image data having data corresponding to a user log-in to the server;

transmitting the coded image data to a client device;

entering into a secure communication connection with a mobile wireless communications device;

receiving via the secure communication connection, authenticating data of the user log-in between the client device and the server without an authentication token, corresponding to the user log-in, being provided to the client device, the authenticating data based on the coded image data transmitted to the client device;

entering into an interactive session with the client device, without an authentication token being provided to the client device, based on comparing the authenticating data with the data of the coded image data, the interactive session corresponding to the user log-in;

conducting a confirmation of a transaction of an application of the server during the interactive session between the client device and the server, the confirmation conducted in response to a communication from the mobile wireless communications device to complete the confirmation, the confirmation being conducted without an authentication token being provided to the client device); and conducting a logoff of the client device from the server, the logoff including receiving a logoff request from the mobile wireless communications device, the logoff request including data to terminate connection of the server and client device corresponding to the user log-in between the client device and the server, wherein the logoff is conducted without an authentication token being provided to the client device.

20. The machine-readable storage device of claim 19, wherein conducting the confirmation in the server includes:

generating an identification of the transaction;

encoding the identification into a second coded image data;

transmitting the second coded image data to the client device;

receiving second authenticating data of the transaction from the mobile wireless communications device without an authentication token being provided to the client device, the authenticating data based on the second coded image data transmitted to the client device; and completing the confirmation of the transaction based on the authenticating data.

21. The machine-readable storage device of claim 20, wherein completing the confirmation in the server includes comparing the identification of the transaction generated by the server with a transaction identification received in the second authenticating data of the transaction.

22. The machine-readable storage device of claim 19, wherein generating coded image data includes encoding a plain text nonce and digital signature.

23. The machine-readable storage device of claim 22, wherein conducting the logoff includes the server invalidating cookies associated with the user log-in and invalidating session data cached by the client device.

24. A mobile wireless communications device comprising:
   a processor;
   a memory operably coupled to the processor, the memory including data storage to store parameters to operate the mobile wireless communications device;
   a camera;
   a decoder;
   a communications interface, wherein the processor, the memory, the camera, the decoder, and the communications interface are arranged to operably:
      capture an image displayed on a client device;
      decode the image;
      establish a secure communication connection between the mobile wireless communications device and a server;
      transmit to the server, via the secure communication connection, authenticating data of a user log-in between the client device and the server without an authentication token, corresponding to the user log-in, being provided to the client device, the authenticating data being based on the decoded image;
      conduct, after the user log-in, a confirmation of a transaction of an application of the server during an interactive session between the client device and the server, the confirmation being conducted via a communication from the mobile wireless communications device to the server to complete the confirmation without an authentication token being provided to the client device; and
      generate, after the user log-in and the confirmation, a logoff request in the mobile wireless communications device to conduct a logoff between the client device and the server, and transmit the logoff request to the server, the logoff request including data to terminate connection of the server and the client device, the data corresponding to the user log-in between the client device and the server, wherein the logoff is conducted without an authentication token being provided to the client device.

25. The mobile wireless communications device of claim 24, wherein the processor, the memory, the camera, the decoder, and the communications interface are arranged to operatively conduct the confirmation in the mobile wireless communications device to:
   capture a second image displayed on the client device during the interactive session;
   decode the second image;
   generate a communication to the server in response to decoded second image; and
   provide, to the server in the communication, second authenticating data of the transaction based on the decoded second image.

26. The mobile wireless communications device of claim 24, wherein the processor, the memory, the camera, the decoder, and the communications interface are arranged to operatively decode the image by decoding the image such that a plain text nonce and digital signature, generated by the server, is produced.

27. A server comprising:
   a processor;
   a memory operably coupled to the processor, the memory including data storage to store parameters to operate the server;
   an encoder;
   a communications interface, wherein the processor, the memory, the encoder, and the communications interface are arranged to operably:
      generate coded image data, the coded image data having data corresponding to a user log-in to the server;
      transmit the coded image data to a client device;
      enter into a secure communication connection with a mobile wireless communications device;
      receive via the secure communication connection, authenticating data of the user log-in between the client device and the server without an authentication token, corresponding to the user log-in, being provided to the client device, the authenticating data based on the coded image data transmitted to the client device;
      enter into an interactive session with the client device, without an authentication token being provided to the client device, based on comparing the authenticating data with the data of the coded image data, the interactive session corresponding to the user log-in;
      conduct a confirmation of a transaction of an application of the server during the interactive session between the client device and the server, the confirmation conducted in response to a communication from the mobile wireless communications device to complete the confirmation, the confirmation being conducted without an authentication token being provided to the client device; and
      conduct a logoff of the client device from the server, the logoff including receiving a logoff request from the mobile wireless communications device, the logoff request including data to terminate connection of the server and client device corresponding to the user log-in between the client device and the server, wherein the logoff is conducted without an authentication token being provided to the client device.

28. The server of claim 27, wherein the processor, the memory, the encoder, and the communications interface are arranged to operably conduct the confirmation in the server to:
   generate an identification of the transaction;
   encode the identification into a second coded image data;
   transmit the second coded image data to the client device;
   receive second authenticating data of the transaction from the mobile wireless communications device without an authentication token being provided to the client device, the second authenticating data based on the second coded image data transmitted to the client device; and
   complete the confirmation of the transaction based on the second authenticating data.

29. The server of claim 27, wherein the server is arranged to generate the coded image data by encoding a plain text nonce and digital signature.

30. The server of claim 27, wherein the server is operable to invalidate session data cached by the client device in execution of the logoff.

* * * * *

UNITED STATES PATENT AND TRADEMARK OFFICE
CERTIFICATE OF CORRECTION

| | | |
|---|---|---|
| PATENT NO. | : 8,701,166 B2 | Page 1 of 1 |
| APPLICATION NO. | : 13/315758 | |
| DATED | : April 15, 2014 | |
| INVENTOR(S) | : Courtney et al. | |

It is certified that error appears in the above-identified patent and that said Letters Patent is hereby corrected as shown below:

In the Claims

In column 18, line 43, in Claim 19, delete "device)" and insert --device--, therefor Signed and Sealed this
Fifth Day of May, 2015

Michelle K. Lee
*Director of the United States Patent and Trademark Office*